United States Patent Office 3,465,792
Patented Sept. 9, 1969

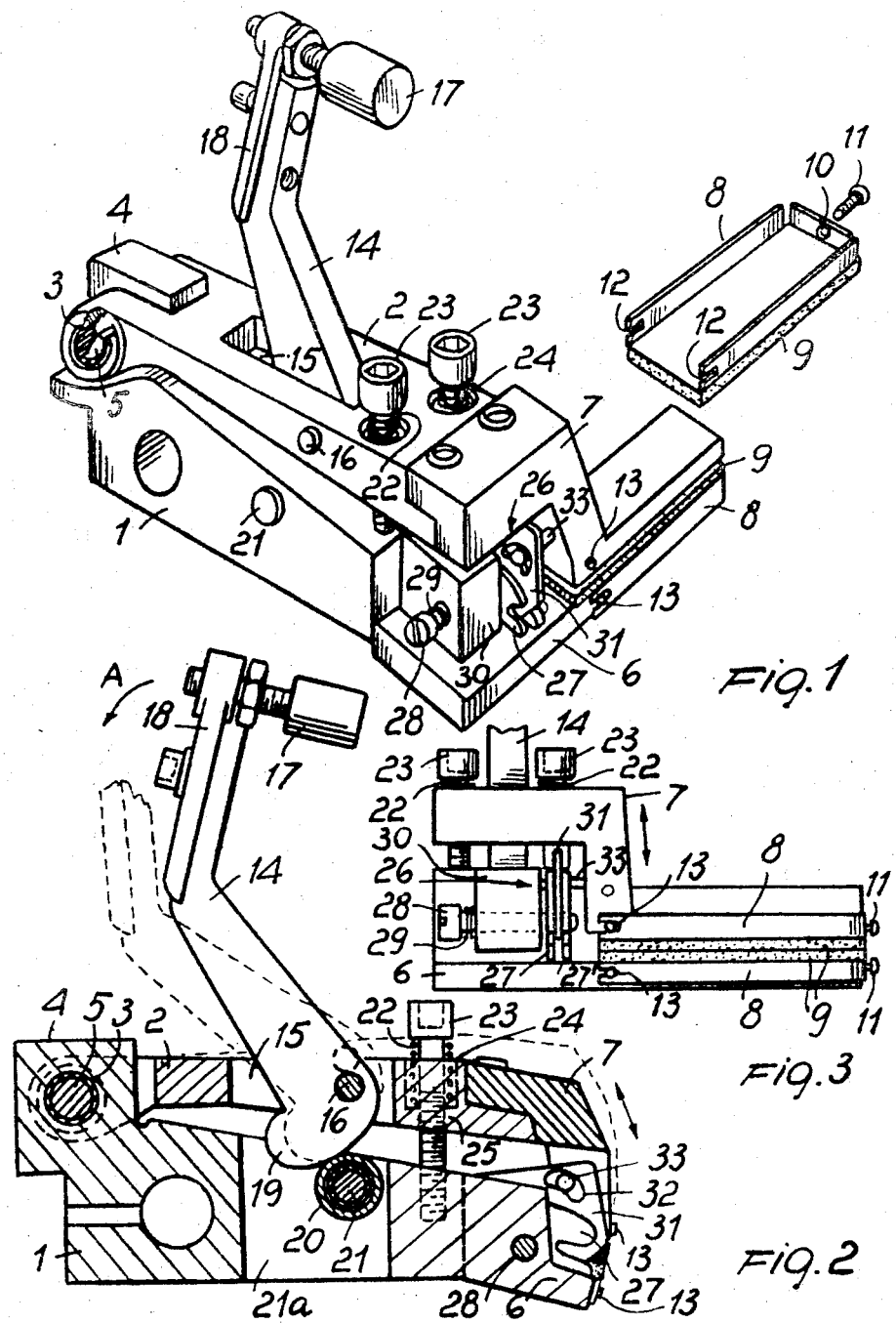

3,465,792
FABRIC LOOM TEMPLE
Carlo Masolo, Via Galilei 25, Desio, Italy
Filed Sept. 11, 1967, Ser. No. 670,512
Claims priority, application Italy, Nov. 12, 1966,
29,863/66
Int. Cl. D03d 45/50
U.S. Cl. 139—266                        2 Claims

ABSTRACT OF THE DISCLOSURE

A temple for looms comprising a jaw fixed on the structure of the loom and a movable jaw pivoted on the fixed jaw, the jaws having cooperating free ends provided with plate elements coated with deformable material, spring means for maintaining the movable jaw in its closed position and lever means for opening the movable jaw.

---

This invention relates to a temple to be mounted, together with a similar temple, on a loom in order to retain the widthwise dimension of the fabric being woven.

Known types of temple for maintaining fabrics taut in a transverse direction, in order to prevent the contraction of the fabric during weaving, usually comprise a fixed jaw and a movable jaw actuated by an operating lever cooperating with the sley of the loom and spring means urging the movable jaw against the fixed jaw. Said lever is actuated directly by said sley and controls the movement of said movable member of the jaw through a gear transmission.

These devices are, however, subject to various disadvantages.

One such disadvantage is constituted by the complication of said transmissions with consequent high costs, an unsure working and mounting difficulties.

Another disadvantage of known types of such temple is constituted by the fact that they are subject to considerable wear, especially at the pivot of the two jaw members.

A further inconvenience of known types is that it is difficult to effect the replacement of members associated with the jaws and designed to engage the fabric.

The main object of the invention is that of eliminating the said disadvantages of conventional temple for looms by providing a particular temple for safe working and easy mounting.

Another important object of this invention is that of providing a temple in which the replacement of the said members associated to the jaws and designed to engage the fabric may be effected in an extremely simple way.

A further object of this invention is that of providing a temple which may easily be mounted on weaving looms of any type.

These and other objects are achieved by the loom temple according to the invention, comprising a jaw or pincer formed of two portions at an end and each bearing a plate which is coated by a deformable material at the other end thereof, which temple is characterized in that, in an intermediate zone of one of said two portions, control lever is pivoted, said lever being provided, at an end, with a buffer for engagement with said sley and, at its other end, with a shaped portion for engagement with a roller or bearing associated to the other end of said two portions, spring biased means being provided to maintain said coated plates in mutual contact, in the rest position.

Further characteristics and advantages will appear more clearly from the following detailed description of a preferred embodiment of a temple according to the invention for looms, illustrated by way of nonlimiting example in the accompanying drawings in which:

FIG. 1 is a perspective view of the temple in the gripping position;

FIG. 2 is a vertical section of the temple in the gripping position;

FIG. 3 is a lateral view of the temple showing a detail of the pincer means and the cutting unit.

With reference to the said figures the temple according to the invention for looms comprises a jaw or pincer of which a first portion 1 is attachable to the loom frame, the other portion 2 pivoting with respect to said first portion.

More precisely the portions 1 and 2 are pivoted at an end with the interposition of two ball or roller bearings 3. The stationary portion 1 has, near the pivot, a projection 4 carrying a transversally inserted pin 5, the ends of which latter are provided with bearings 3. Said pivotable portion 2 terminates, at said pivot, in a fork, the two prongs of which are bored out in order to receive said bearings 3.

At the other end of the portions 1 and 2 respective projections 6 and 7 are secured, which have plate-like portions which in turn support plates 8 provided with a layer 9 of deformable material such, for instance, as rubber or plastics material.

Each plate 8 is substantially of a drawer-like shape with three edge walls.

A hole is drilled in the central one of these walls in order to provide a passage for a screw 11 (FIG. 1) and the other two walls each have a slot 12 at the end distant from said central wall; said slots 12 being designed to engage projecting pins 13 of said portions 6 and 7.

As clearly shown in FIG. 3, each plate 8 may be re-removed from the temple by unscrewing the screw 11 and then laterally slipping out the said plate 8. Conversely the plate 8 may be secured to the said projections 6 or 7 by sliding it along the projection until said slots 12 engage with the pins 13, and then screwing the screw 11.

After mounting, the two plates 8 are arranged in manner such that the deformable layers 9 are in mutually facing relationship, so as to form a clamp for holding the edges of the fabric being manufactured.

A lever 14 is provided for the control of the temple and is mounted so as to be capable of oscillation through an aperture 15 in the said portion 2. A pin 16 passing transversally through said aperture, forms the fulcrum of said lever 14.

The lever 14 carries, in its upper section, a buffer 17 adapted to engage with the sley, said buffer being screwed on a plate 18 which is adjustably secured to said lever 14. At the other end said lever 14 has a rounded head 19 whose cam-like surface engages with a ball or roller bearing 20 freely mounted on a transverse pin 21 (FIG. 2). Said pin 21 is secured to the said portion 1 in an aperture 21a capable of housing said bearing 20 and receiving the end 19 of the lever 14.

The portions 1 and 2 are normally maintained against each other by two springs 22 mounted on the respective bolts 23 caused to pass through holes 24 in the portion 2 and screwed into the portion 1.

After the screwing of each bolt 23 the respective spring 22 is compressed between the head of said bolt and a shoulder 25 formed in the portion 2 at the hole 24 (FIG. 2).

In such manner the two springs 22 urge the portion 2 towards the portion 1 so as to cause a contact between the deformable layers 9 of the plates 8.

The said layers 9 may be mutually spaced apart for a short distance, by acting on the lever 14, in the direction of the arrow A shown in FIG. 2, so as to carry the lever 14 into the position indicated (in the same figure) in dotted lines. Accordingly, the rounded end 19 of the lever 14 is caused to slide on the bearing 20 raising said lever and of the portion 2, finally further compressing the return spring 22. When the action on the lever 14 ceases, the said spring 22 acts in the sense of relowering the portion 2 until the layers 9 contact to one another once again.

The movement of the lever 14 occurs by the direct action of the sley upon said buffer 17.

On a loom two temples of the above described type are provided which are mirror image shapes of each other; one of said temples may be supplied with a cutting unit 26 adapted to cut the threads in proximity of the clamp formed by the plates 8.

The cutter unit 26 is substantially of scissor type comprising two fixed blades 27, 27' associated to said portion 1 by a screw 28 whose end is screwed in the blade 27'. On the other end of screw 28 is arranged a spring 29 which, acting between the screw head itself and a locking member 30 through which the shaft of the screw passes, maintains the blades 27 near the said locking member 30.

Between the fixed blades 27, 27' is slidingly mounted a movable blade 31 which is fulcrumed at a point to said locking member 30 and has a slot 32. In said slot 32 is inserted a pin 33 rigid with the projection 7 of the portion 2.

With such arrangement the movable blade 31 is displaced when it is actuated by the lever 14, that is when the portion 2 oscillates. In this case, the pin 33 engaged in the said slot 32 causes the blade 31 to oscillate between the fixed blades 27 so as to determine a cutting of the threads passing transversally to said blades.

From what has been described the working of the temple according to the invention should be clear.

After having secured the portion 1 in a suitable position on the loom frame, during the working of the latter, the sley meets the said buffer 17 at each stroke so as to cause the lever 14 to oscillate about the fulcrum 16 determining a corresponding oscillation of the portion 2.

There consequently occurs the opening of the clamp formed by the plates 8 and the successive reclosure of said clamp due to the return springs 22.

The oscillation of the portion 2 occurs practically without wear due to the presence of the bearings 3 at the pivot and the presence of the bearing 20 for the engagement with end 19 of the lever 14.

A temple is therefore obtained having the characteristics of long life and extremely regular and precise working.

The plates 8 carrying the deformable layers 9 are provided in size considerably greater than the plates actually in use, whence the temple according to the invention is suitable for retaining material of any type, either fine materials such as nylon or silk or coarser materials such as cotton or the like.

As may be noted the mounting of the cutting unit 26 allows the cutting of the threads at the edges of the fabric being manufactured without manual intervention as usually required.

The lever 14 may be reversed with the buffer 17 turned downwards so as to engage with the sley at a level lower than that of the body of the temple. In such case the fulcrum 16 is fixed to the fixed portion 1 while the bearing 20 is mounted on the pivotable portion 2.

Also, for example, the lever 14 may be mounted laterally to the portion 1 or 2, laterally mounting also the corresponding bearing 20.

What I claim is:

1. A temple for looms comprising a fixed jaw fixed with one end thereof on the structure of the loom and having a free end, a movable jaw pivoted with one extremity thereof on said fixed jaw near said one end and having a free extremity cooperating with said free end of said fixed jaw, spring means urging said free extremity of said movable jaw against said free end of said fixed jaw, plate elements having a coating of deformable material and arranged on said free end and said free extremity, lever means for actuating said movable jaw wherein, according to the improvement, said lever means comprise a single lever pivoted with one end thereof on one of said jaws in an intermediate portion thereof and having the other end thereof projecting therefrom, said single lever having said one end thereof in the form of a cam, a stop secured on the other of said jaws in an intermediate position near said cam, said stop being in the form of a roller bearing in rolling engagement with said cam to force open said movable jaw when said single lever is actuated at the other end thereof.

2. A temple according to claim 1, wherein said free end of the fixed jaw and said free extremity of the movable jaw have plate like portions and wherein said plate elements are substantially drawer-shaped for removably mounting them on said plate-like portions, said plate-like portions and said plate elements having engaging notch and pin means for holding said plate elements in position on said plate like portion.

References Cited

UNITED STATES PATENTS

| | | | |
|---|---|---|---|
| 2,310,125 | 2/1943 | Shelton | 139—293 |
| 3,012,587 | 12/1961 | Masolo | 139—293 |

HENRY S. JAUDON, Primary Examiner